(12) United States Patent
Wyler

(10) Patent No.: US 8,381,779 B1
(45) Date of Patent: Feb. 26, 2013

(54) SYSTEM FOR WIRELESS REFUELING OF AN AIRCRAFT

(75) Inventor: John Stephen Wyler, Berwyn, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/270,328

(22) Filed: Oct. 11, 2011

(51) Int. Cl.
*B65B 1/30* (2006.01)

(52) U.S. Cl. ............ 141/94; 141/95; 141/192; 340/540; 340/618

(58) Field of Classification Search ............... 141/94–96, 141/192, 350; 340/540, 618
See application file for complete search history.

(56) References Cited

U.S. PATENT DOCUMENTS

| | | | | |
|---|---|---|---|---|
| 5,156,198 A * | 10/1992 | Hall | ................................ | 141/94 |
| 5,722,469 A * | 3/1998 | Tuminaro | ....................... | 141/94 |
| 5,890,520 A * | 4/1999 | Johnson, Jr. | .................... | 141/94 |
| 5,906,228 A * | 5/1999 | Keller | .............................. | 141/94 |
| 6,085,805 A * | 7/2000 | Bates | ................................ | 141/94 |
| 6,157,317 A * | 12/2000 | Walker | ........................... | 340/7.1 |
| 6,381,514 B1 * | 4/2002 | Hartsell, Jr. | .................. | 700/236 |
| 7,523,770 B2 * | 4/2009 | Horowitz et al. | ............... | 141/94 |

* cited by examiner

*Primary Examiner* — Timothy L Maust
(74) *Attorney, Agent, or Firm* — McGarry Bair PC

(57) ABSTRACT

A system for wirelessly refueling an aircraft includes an aircraft having a fuel tank, a control valve, a fuel sensor outputting a fuel signal indicative of the amount of fuel in the at least one fuel tank, and a controller controlling the control valve in response to the fuel signal, a refueling apparatus having a fuel supply, a pump and a controller in which is stored a fuel profile including fuel data indicative of the amount of fuel to be supplied to the at least one fuel tank, and wireless communication systems operably coupled to the controllers within the aircraft and refueling apparatus to control the operation of the control valve and the pump to fill the at least one fuel tank in accordance with the fuel profile and in response to the fuel signal.

20 Claims, 1 Drawing Sheet

SYSTEM FOR WIRELESS REFUELING OF AN AIRCRAFT

BACKGROUND OF THE INVENTION

Contemporary aircraft refueling is accomplished by attaching a refueling hose to the refuel connection at the wing refueling station on the aircraft. The refueling station has a refueling control panel that provides an indication of the fuel in each tank and a means to set a desired fuel quantity for each tank. As fuel is pumped into the aircraft, the refueling control panel monitors the fuel in each tank and shuts off fuel flow, via one or more valves, to the tanks as they reach the desired fill level. Because of the handling of fuel and the proximity of the refueling control panel to the exterior of the aircraft, which is a relatively harsh environment, the refueling control panel must be both physically and electronically robust to resist physical damage from environmental conditions and use, and to remain electrically shielded from the fuel. The required robustness requires that the refueling control panel be relatively heavy and relatively costly, both of which are undesirable in an aircraft environment.

BRIEF DESCRIPTION OF THE INVENTION

In one embodiment, a refueling system for an aircraft includes an aircraft having at least one fuel tank, a refuel line, a control valve, a fuel sensor outputting a fuel signal indicative of the amount of fuel in the at least one fuel tank, a first controller receiving the fuel signal and controlling the control valve in response to the fuel signal, and a first wireless communication system operably coupled to the first controller. The refueling system also includes a refueling apparatus having a fuel supply, a dispensing hose configured to mate with the inlet of the refuel line, a pump, a second controller having a memory in which is stored a fuel profile including fuel data indicative of the amount of fuel to be supplied to the at least one fuel tank and controlling the pump, and a second wireless communication system operably coupled to the second controller. The first and second wireless communication systems are in communication such that the first and second controllers control the operation of the control valve and the pump to fill the at least one fuel tank in accordance with the fuel profile and in response to the fuel signal.

In another embodiment, a wireless communication system for a refueling system for an aircraft having at least one fuel tank, a refuel line, a control valve controlling the flow of fuel through the refuel line, a fuel sensor outputting a fuel signal indicative of the amount of fuel in the at least one fuel tank, a first controller receiving the fuel signal and controlling the control valve in response to the fuel signal and a refueling apparatus having a fuel supply, a dispensing hose configured to mate with the inlet of the refuel line, a pump, a second controller having a memory in which is stored a fuel profile including fuel data indicative of the amount of fuel to be supplied to the at least one fuel tank and controlling the pump. The wireless communication system includes a first wireless communication system provided on the aircraft and operably coupled to the first controller and a second wireless communication system provided on the refueling apparatus and operably coupled to the second controller and wherein the first and second wireless communication systems are in communication such that the first and second controllers control the operation of the control valve and the pump to fill the at least one fuel tank in accordance with the fuel profile and in response to the fuel signal.

DESCRIPTION OF EMBODIMENTS OF THE INVENTION

Figure 1:
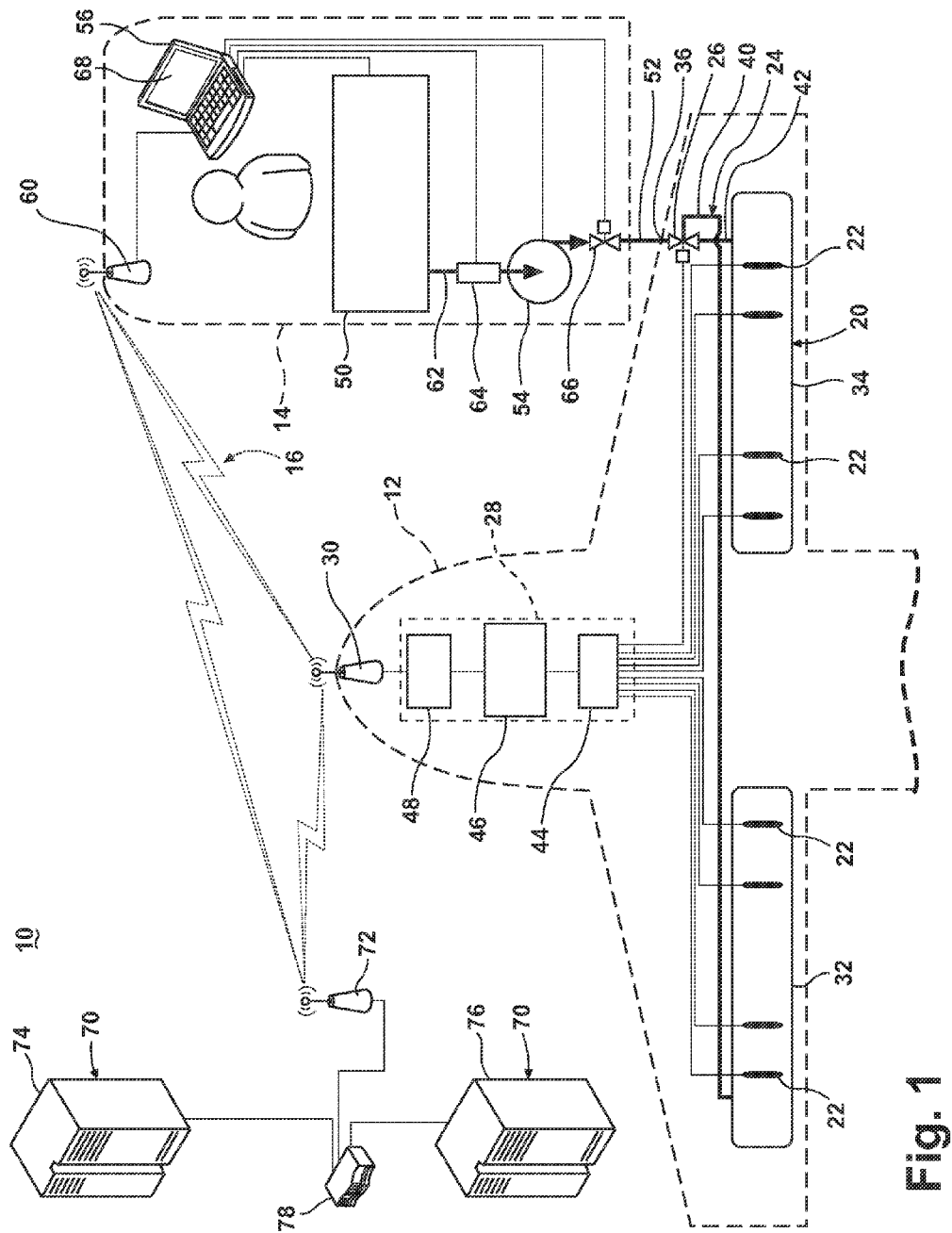
FIG. 1 is a schematic view of a refueling system for an aircraft according to an embodiment of the invention.

FIG. 1 illustrates a refueling system 10 for an aircraft 12 according to one embodiment of the invention; such a refueling system 10 may replace the aircraft mounted refueling control panel found in contemporary aircraft. The refueling system includes among other things the aircraft 12, a refueling apparatus 14, and a wireless communication system 16. While a commercial aircraft is illustrated, the refueling system 10 may be used in conjunction with any type of aircraft, for example, without limitation, fixed-wing, rotating-wing, rocket, commercial aircraft, personal aircraft, and military aircraft.

The aircraft 12 may include one or more fuel storage tanks 20, a fuel sensor 22, a refuel line 24, a control valve 26, a controller 28, and a first wireless communication system 30. The fuel storage tanks 20 may be any suitable type of fuel tank including an integral tank that is incorporated into the aircraft structure, a rigid removable tank that may be installed into a compartment designed to accommodate the tank, and bladder fuel tanks. The aircraft 12 has been illustrated as having both a left wing fuel storage tank 32 and a right wing fuel storage tank 34. Although not illustrated, the aircraft 12 may also include other fuel storage tanks including a central tank (not shown) from which both the left and right wing fuel storage tanks 32, 34 may be fed fuel before it is supplied to one or more engines. While each of the left and right wing fuel storage tanks 32, 34 has been illustrated as a single tank structure it is contemplated that each of the left and right wing fuel storage tanks 32, 34 may include multiple fuel tanks.

One or more fuel sensors 22 may be included in each of the left and right wing fuel storage tanks 32, 34. Multiple fuel sensors 22 have been illustrated and may be used to compensate for fuel tank shape and aircraft pitch and roll attitudes. Each fuel sensor 22 may output a fuel signal indicative of the amount of fuel in the corresponding fuel storage tank 20. Any suitable type of fuel sensor may be used. By way of non-limiting example, the multiple fuel sensors 22 illustrated may be capacitor probes wherein capacitance detected by the probes is proportional to fuel height within the tank.

The refuel line 24 may be fluidly coupled to the left and right wing fuel storage tanks 32, 34 and may have an inlet 36 accessible from an exterior 38 of the aircraft 12. While the inlet 36 is shown as being towards an end of a wing of the aircraft 12, the inlet 36 may be in other locations on the aircraft 12. The control valve 26 may be located along the refuel line 24 and may be configured to control a flow of fuel through the refuel line 24 to the fuel storage tanks 20. In the simple case where only a single fuel storage tank 20 is present, the refuel line 24 may be a single line and the control valve 26 may control the flow of fuel through the refuel line 24 to the fuel storage tank 20. In the case where there are multiple fuel storage tanks 20, such as the left and right wing fuel storage tanks 32, 34, an arrangement of refuel lines 24 may fluidly couple the inlet 36 to the multiple fuel storage tanks 20 and the control valve 26 may selectively fluidly couple the inlet 36 to each of the refuel lines 24 and the left and right wing fuel storage tanks 32, 34. An arrangement of control valves and pumps (not shown) may be associated with the multiple tanks to distribute fuel between the fuel storage tanks 20. In the illustrated example the control valve 26 is capable of directing fuel through either a first section 40 of the refuel line 24 to the left wing fuel storage tank 32 or through a second section 42 of the refuel line 24 to the right wing fuel storage tank 34.

The controller 28 may include various units and may be configured to transmit data and control signals between different sensors, actuators, and displays on the aircraft 12. More specifically, the controller 28 may be configured to receive the fuel signals from the multiple fuel sensors 22 and control the control valve 26 based thereon. By way of non-limiting example, the controller 28 may include a Remote Data Interface Unit (RDIU) 44 that may receive the fuel signals from the fuel sensors 22. An Integrated Modular Avionics (IMA) computer 46 may also be included in the controller 28 and may include a fuel quantity application software package that may run in real time and calculate the quantity of fuel in the left and right wing fuel storage tanks 32, 34 based on the sensor readings from the RDIU 44. A refueling control application may also run on the IMA computer 46 and may control the control valve 26 during fueling of the aircraft 12. A Health and Trend Monitoring Unit (AHTMU) 48 may also be included in the controller 28 and may monitor the health of the aircraft 12 so as to predict when maintenance will be required and thus avoid maintenance delays at the gate.

The first wireless communication system 30 may include a communication link included in the aircraft 12 and may be operably coupled to the controller 28. Such a wireless communication system 30 may be any variety of communication mechanism capable of wirelessly linking with other systems and devices and may include, but is not limited to, packet radio, satellite uplink, Wireless Fidelity (WiFi), WiMax, Bluetooth, ZigBee, 3G wireless signal, code division multiple access (CDMA) wireless signal, global system for mobile communication (GSM), 4G wireless signal, long term evolution (LTE) signal, Ethernet, or any combinations thereof. It will also be understood that the particular type or mode of wireless communication is not critical to this invention, and later-developed wireless networks are certainly contemplated as within the scope of this invention. Further, the wireless communication system 30 may be communicably coupled with the controller 28 through a wired link without changing the scope of this invention.

The refueling apparatus 14 is illustrated as a refueling tanker that includes a fuel supply such as a fuel reservoir 50, a dispensing hose 52, a pump 54, a controller 56 having a memory (not shown), and a second wireless communication system 60 operably coupled to the second controller 56. Although one reservoir 50 has been illustrated, it is contemplated that the tanker refueling apparatus 14 may include any number of fuel reservoirs 50. It is also contemplated that the tanker refueling apparatus 14 may have no reservoirs in which case its fuel supply may include a fluid coupling to an underground fuel distribution pipeline.

It is also contemplated that the refueling apparatus 14 may be other than the illustrated tanker. For example, the refueling apparatus 14 may be an underground or aboveground fuel distribution system. Such fuel distribution systems may be common in larger airports that have a piping system to distribute fuel. In that case, the fuel supply for the refueling apparatus 14 may include a fluid coupling to the distribution pipeline instead of the reservoir 50. For purposes of the remainder of this description the refueling apparatus 14 will be described as a refueling tanker that includes a fuel reservoir 50.

The dispensing hose 52 may be fluidly coupled to the fuel reservoir 50 through the pump 54. An internal fuel flow line 62 may fluidly couple the pump 54 to the fuel reservoir 50 and such an internal fuel flow line 62 may be thought of as an extension of the dispensing hose 52. The dispensing hose 52 is configured to mate with the inlet 36 of the refuel line 24 of the aircraft 12 and, thus, may extend from the tanker refueling apparatus 14. A flow meter 64 may be coupled to either the internal fuel flow line 62 or the dispensing hose 52. A valve 66 may be included within the tanker refueling apparatus 14 to control or shut-off the flow of fuel leaving the tanker refueling apparatus 14 through the dispensing hose 52.

It is contemplated that the tanker refueling apparatus 14 is mobile, such as a vehicle having a tank forming the fuel reservoir 50, which provides the flexibility of driving the fuel to the aircraft for refueling. The tanker refueling apparatus 14 may also be a ground station, which in most cases is not mobile.

The controller 56 included in the tanker refueling apparatus 14 may have a memory (not shown) to store a fuel profile. The fuel profile may include fuel data indicative of the amount of fuel to be supplied to the fuel storage tanks 20 on the aircraft 12. The controller 56 may be operably coupled to the pump 54, the flow meter 64, and the control valve 66, to control these elements to supply fuel to the aircraft 12. Although the controller 56 has been illustrated as a laptop computer, any suitable controller 56 may be used. It is contemplated that the controller 56 may include a user interface screen 68 that illustrates the status of various devices on the tanker refueling apparatus 14. The user interface screen 68 may also include status indicators related to the aircraft 12 such as the amount of fuel in the fuel storage tanks 20. The user interface screen 68 may include status indicators (not shown) of the fueling control valves as well as other various indicators. The second wireless communication system 60 may be operably coupled to the second controller 56. It is contemplated that like the first wireless communication system 30 included in the aircraft that the second wireless communication system 60 may include any suitable wireless communication link in the tanker refueling apparatus 14 and that the second wireless communication system 60 may be communicably coupled with the controller 56 through a wired or wireless link.

By way of non-limiting example, the first wireless communication system 30 and the second wireless communication system 60 may be configured to communicate with each other and may form a part of the wireless communication system 16. Further, each of the first or second wireless communication systems 30, 60 may be used as a link to other portions of the wireless communication system 16 including ground monitors 70, which may communicate through a suitable wireless communication system 72. By way of non-limiting examples, the ground monitors 70 may include airline central maintenance or airline control 74 and a refueling depot 76. Such ground monitors may be directly coupled with the suitable wireless communication system 72 or may be indirectly coupled to the suitable wireless communication system 72 through a suitable communication link 78, which may include an internet connection to couple the ground monitors 70 to each other and to the wireless communication system 72.

Initially, airline control 74 may generate a fuel profile. Such a fuel profile may include data indicative of a total amount of fuel that the aircraft 12 should include for its next flight. In the case where the airline control 74 is informed of the current fuel load in the aircraft 12, the fuel profile may also include fuel data indicative of the amount of fuel to be supplied to the aircraft 12 to reach the total amount of fuel the aircraft 12 should include. In the case where the aircraft 12 includes multiple fuel tanks, the fuel profile may include fuel data for each of the multiple fuel tanks. Once the fuel profile has been generated, the airline control 74 may communicate the fuel profile to the refueling depot 76. The refueling depot 76 may be in communication through the third wireless communication system 72 with at least the second wireless communication system 60 and may transmit the fuel profile from the refueling depot 76 to the tanker refueling apparatus 14. Alternatively, airline control 74 may communicate directly through the third wireless communication system 72 with the second wireless communication system 60 of the tanker refueling apparatus 14.

A refueling application may be run on the controller 56 of the tanker refueling apparatus 14. The refueling application may allow the user to input desired fuel quantities for each of the left and right wing fuel storage tanks 32, 34 such information may have been garnered from the fuel profile previously sent to the tanker refueling apparatus 14. Alternatively, such calculations may be done automatically by the refueling application being run on the controller 56.

The wireless communication system 60 of the tanker refueling apparatus 14 may connect to the wireless communication system 30 of the aircraft 12 when the tanker refueling apparatus 14 arrives at the location of the aircraft 12. It is contemplated that some network security protocol may be used to allow access to the refueling functions of both controllers 28 and 56. By way of non-limiting example, it is contemplated that a user may need to input the aircraft tail number along with an employee ID and password to access such refueling functions.

Once the dispensing hose 52 and the refuel line 24 have been suitably connected the controllers 28 and 56 may operate to refuel the aircraft 12. During this time, the first and second wireless communication systems 30 and 60 may be in communication such that the first and second controllers 28 and 56 may control the operation of the control valves 26 and 66 and the pump 54 to fill each of the left and right wing fuel storage tanks 32, 34 in accordance with the fuel profile and in response to a fuel signal from the fuel sensors 22. The first and second wireless communication systems 30 and 60 may communicate at least one of the fuel signal from the controller 28 to the controller 56 and the fuel profile from the controller 56 to the controller 28. Further, the first and second wireless communication systems 30 and 60 may communicate the fuel load data and/or the current fuel load data between the controllers 28 and 56. Thus, the first and second controllers 28 and 56 may control the operation of the control valves 26 and 66 and the pump 54 to supply fuel from the reservoir 50 to the left and right wing fuel storage tanks 32, 34 until the current fuel load data satisfies the fuel load data in the fuel profile, which is indicative of a total amount of fuel to be stored in the left and right wing fuel storage tanks 32, 34. The controller 28 may operate the control valve 26 to selectively fill each of the left and right wing fuel storage tanks 32, 34 according to the fuel profile. It is contemplated that the left and right wing fuel storage tanks 32, 34 may be refilled concurrently or sequentially. Regardless of the timing, the controller 28 may control the control valve 26 and the controller 56 may control the pump 54 to fill each of the left and right wing fuel storage tanks 32, 34 according to the fuel profile.

More specifically, as fuel is being supplied by the tanker refueling apparatus 14 to the aircraft 12 the fuel sensors 22 sense the amount of fuel in each of the left and right wing fuel storage tanks 32, 34. This information may be processed by the controller 28 and may be used to control the valve 26. More specifically, the first controller 28 may operate the control valve 26 to selectively close the fluid communication between the tanker refueling apparatus 14 and the left and/or right wing fuel storage tanks 32, 34 when the fuel signal is indicative of the fuel load in the fuel tank 20 satisfying the fuel data. The first wireless communication system 30 may repeatedly communicate to the second wireless communication system 60 an updated fuel signal representative of the amount of fuel in each of the each of the left and right wing fuel storage tanks 32, 34. In this manner, the controller 28 and the wireless communication system 30 may send a fuel signal that indicates current fuel load data indicative of a current amount of fuel in each of the left and right wing fuel storage tanks 32, 34 to the controller 56 of the tanker refueling apparatus 14. The controller 56 may shut off the pump 54 when the updated fuel signal is indicative of the fuel storage tanks 20 having received the amount of fuel according to the fuel profile. Thus, when the fuel signals indicate that fueling is complete and the left and right wing fuel storage tanks 32, 34 are properly filled, fuel delivery may be shut off. The controller 56 may also close the control valve 66 when it is determined that fueling is complete to ensure that no additional fuel leaves the tanker refueling apparatus 14.

It is also contemplated that at least one of the first and second controllers 28 and 56 may determine a supply load of fuel needed to fill the left and right wing fuel storage tanks 32, 34 to the fuel load based on the fuel load data and the current fuel load data. The controller 28 may shut off the control valve 26 to each of the left and right wing fuel storage tanks 32, 34 as required. The controller 28 may also transmit fuel quantity information to the tanker refueling apparatus 14 such that it may be displayed on the user interface 68. The controllers 28 and 56 may receive status signals from various sensors and components. By way of non-limiting example, the controller 56 may receive a signal from the flow meter 64 to obtain additional readings on the amount of fuel being pumped in order to cross check numbers and determine if any leaks exist in the refueling system.

The above described system provides a means for wireless communication between the aircraft fuel system and the refueling apparatus such that refueling operations may be initiated from a controller in the refueling apparatus. The above described system provides a variety of benefits including that an expensive refuel control panel is no longer needed in the aircraft wing. This provides a number of cost saving benefits. For example, the aircraft refueling control panel adds about ten pounds of weight to the aircraft while the associated wiring adds approximately another ten pounds of weight to the aircraft. The above described system not only saves the initial cost of the panel and wiring as well as the cost to install the panel and associated wiring but it also saves approximately twenty pounds of weight in the aircraft. This adds up in fuel savings costs over the life of the aircraft. Further, expenses may be saved in that there would be no cost to maintain the refuel panel over the life of the aircraft.

The above system is easier and more convenient to use than a contemporary refuel panel. Contemporary refuel panels require that the user dial in fuel quantity settings in extreme temperatures in the winter and summer. Bright sunlight reflecting off the tarmac may make displays on the refuel panel difficult to read. Further, because contemporary refuel control panels are located next to the refueling hose connection, it is not uncommon for the hose to slip while being connected and damage the control panel. The above described system provides additional benefits in that these problems are avoided.

Further, there are several operational advantages to the above described system. First, wireless communications to aircraft control for maintenance tracking and billing purposes are allowed. Second, the fuel quantity data from the refueling apparatus may be used to monitor the health of the aircraft fuel quantity measurement system. That is, the refueling apparatus may transmit the quantity of fuel loaded to the aircraft AHTMU and the AHTMU may compare the refueling apparatus measured quantity with the aircraft system measured quantity, thus providing a measure of accuracy or health of the aircraft.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A refueling system for an aircraft comprising:
    an aircraft comprising:
        at least one fuel tank;
        a refuel line having an inlet accessible from an exterior of the aircraft and fluidly coupled to the fuel tank;
        a control valve controlling a flow of fuel through the refuel line;
        a fuel sensor outputting a fuel signal indicative of an amount of fuel in the at least one fuel tank;
        a first controller receiving the fuel signal and controlling the control valve in response to the fuel signal; and
        a first wireless communication system operably coupled to the first controller; and
    a refueling apparatus comprising:
        a fuel supply;
        a dispensing hose configured to mate with the inlet of the refuel line;
        a pump fluidly coupling the dispensing hose to the fuel supply;
        a second controller having a memory in which is stored a fuel profile including fuel data indicative of the amount of fuel to be supplied to the at least one fuel tank and controlling the pump; and
        a second wireless communication system operably coupled to the second controller;
    wherein the first and second wireless communication systems are in communication such that the first and second controllers control the operation of the control valve and the pump to fill the at least one fuel tank in accordance with the fuel profile and in response to the fuel signal.

2. The refueling system of claim 1 wherein the fuel profile comprises fuel load data indicative of a total amount of fuel to be stored in the at least one fuel tank.

3. The refueling system of claim 2 wherein the fuel signal comprises current fuel load data indicative of a current amount of fuel in the at least one fuel tank.

4. The refueling system of claim 3 wherein the first and second controllers control the operation of the control valve and pump to supply fuel from the fuel supply to the at least one fuel tank until the current fuel load data satisfies the fuel load data.

5. The refueling system of claim 3 wherein at least one of the first and second controllers determines a supply load of fuel needed to fill the at least one fuel tank to the fuel load based on the fuel load data and the current fuel load data.

6. The refueling system of claim 5 wherein the first controller shuts off the control valve and the second controller shuts off the pump when the supply load of fuel is supplied from the fuel supply to the at least one fuel tank.

7. The refueling system of claim 3 wherein the first and second wireless communication systems communicate at least one of the fuel load data and the current fuel load data between the first and second controllers.

8. The refueling system of claim 1 wherein the first and second wireless communication systems communicate at least one of the fuel signal from the first controller to the second controller and the fuel profile from the second controller to the first controller.

9. The refueling system of claim 1, further comprising a refueling depot having a third wireless communication system in communication with at least the second wireless communication system and transmitting the fuel profile from the refueling depot to the refueling apparatus.

10. The refueling system of claim 9, further comprising an airline control in communication with the refueling depot and generating the fuel profile and then communicating the fuel profile to the refueling depot.

11. The refueling system of claim 1 wherein the at least one fuel tank comprises multiple fuel tanks and the fuel profile comprises fuel data for each of the multiple fuel tanks.

12. The refueling system of claim 11 wherein the first controller controls the control valve and the second controller controls the pump to selectively fill each of the multiple fuel tanks according to the fuel profile.

13. A wireless communication system for a refueling system for an aircraft comprising an aircraft having at least one fuel tank, a refuel line having an inlet accessible from an exterior of the aircraft and fluidly coupled to the fuel tank, a control valve controlling a flow of fuel through the refuel line, a fuel sensor outputting a fuel signal indicative of an amount of fuel in the at least one fuel tank, a first controller receiving the fuel signal and controlling the control valve in response to the fuel signal; and a refueling apparatus having a fuel supply, a dispensing hose configured to mate with the inlet of the refuel line, a pump fluidly coupling the dispensing hose to the fuel supply, a second controller having a memory in which is stored a fuel profile including fuel data indicative of the amount of fuel to be supplied to the at least one fuel tank and controlling the pump, the wireless communication system comprising:
    a first wireless communication system provided on the aircraft and operably coupled to the first controller; and
    a second wireless communication system provided on the refuel apparatus and operably coupled to the second controller;
    wherein the first and second wireless communication systems are in communication such that the first and second controllers control the operation of the control valve and the pump to fill the at least one fuel tank in accordance with the fuel profile and in response to the fuel signal.

14. The wireless communication system of claim 13 wherein the first and second wireless communication systems communicate at least one of the fuel signal from the first controller to the second controller and the fuel profile from the second controller to the first controller.

15. The wireless communication system of claim 14 wherein the first wireless communication system repeatedly communicates to the second wireless communication system an updated fuel signal.

16. The wireless communication system of claim 15 wherein the second wireless communication provides the updated fuel signal to the second controller and the second controller shuts off the pump when the updated fuel signal is indicative of the at least one fuel tank having received the amount of fuel according to the fuel profile.

17. The wireless communication system of claim 14 wherein the first wireless communication system provides the fuel data to the first controller and the first controller shuts off the control valve when the fuel signal is indicative of a fuel load in the at least one fuel tank satisfying the fuel data.

18. The wireless communication system of claim 13, further comprising a refueling depot having a third wireless communication system in communication with at least the second wireless communication system and transmitting the fuel profile from the refueling depot to the refueling apparatus.

19. The wireless communication system of claim 18, further comprising an airline control in communication with the refueling depot and generating the fuel profile and then communicating the fuel profile to the refueling depot.

20. The wireless communication system of claim 13 wherein the at least one fuel tank comprises multiple fuel tanks and the fuel profile comprises fuel data for each of the multiple fuel tanks and at least one of the first controller controls the control valve and the second controller controls the pump to selectively fill each of the multiple fuel tanks according to the fuel profile.

* * * * *